US010947141B2

(12) United States Patent
Chandran et al.

(10) Patent No.: US 10,947,141 B2
(45) Date of Patent: Mar. 16, 2021

(54) SYSTEMS AND METHODS FOR CONTROLLING DENITRIFICATION IN A DENITRIFYING BIOLOGICAL REACTOR

(71) Applicant: THE TRUSTEES OF COLUMBIA UNIVERSITY IN THE CITY OF NEW YORK, New York, NY (US)

(72) Inventors: Kartik Chandran, New York, NY (US); Luke Plante, Brooklyn, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 16/311,892

(22) PCT Filed: Jun. 22, 2017

(86) PCT No.: PCT/US2017/038852
§ 371 (c)(1),
(2) Date: Dec. 20, 2018

(87) PCT Pub. No.: WO2017/223372
PCT Pub. Date: Dec. 28, 2017

(65) Prior Publication Data
US 2019/0202723 A1 Jul. 4, 2019

Related U.S. Application Data

(60) Provisional application No. 62/353,305, filed on Jun. 22, 2016.

(51) Int. Cl.
*C02F 1/66* (2006.01)
*C02F 3/00* (2006.01)
(Continued)

(52) U.S. Cl.
CPC ............... *C02F 3/305* (2013.01); *C02F 1/66* (2013.01); *C02F 3/006* (2013.01); *C02F 3/307* (2013.01);
(Continued)

(58) Field of Classification Search
CPC .. C02F 2209/14; C02F 3/302; C02F 2209/15; C02F 2209/02; C02F 2209/08;
(Continued)

(56) References Cited

U.S. PATENT DOCUMENTS 5,482,630 A 1/1996 Lee et al.
5,651,892 A 7/1997 Pollock
(Continued)

OTHER PUBLICATIONS

Cao et al, "Achieving partial denitrification with sludge fermentation liquid as carbon source: The effect of seeding sludge", 2013, Biosource Technology 149, pp. 570-574. (Year: 2013).*
(Continued)

*Primary Examiner* — Claire A Norris
(74) *Attorney, Agent, or Firm* — Murtha Cullina LLP; Anthony P. Gangemi

(57) ABSTRACT

Methods and systems for controlling a denitrification reaction in a biological nitrogen removal reactor including denitrifying bacteria to favor denitratation of nitrate to nitrite and limit denitritation of nitrite to nitrogen gas are disclosed. pH, dissolved oxygen levels, solids retention time, and chemical oxygen demand to nitrogen ratio are controlled to favor this reaction. Wastewater or contaminated groundwater including concentrations of ammonium and nitrate are continuously fed to the biological nitrogen removal reactor along with a source of carbon and electrons as an influent, which is treated to form a nitrite effluent. The nitrite effluent may then be fed to an anammox reactor including anammox bacteria for production of nitrogen gas. The system may be operated under substantially anoxic conditions, which provides significant cost savings without sacrificing efficiency or productivity compared to traditional wastewater treatment systems and processes.

16 Claims, 3 Drawing Sheets

(51) Int. Cl.
*C02F 3/34* (2006.01)
*C02F 3/30* (2006.01)

(52) U.S. Cl.
CPC ........ *C02F 3/341* (2013.01); *C02F 2209/005* (2013.01); *C02F 2209/06* (2013.01); *C02F 2209/08* (2013.01); *C02F 2209/16* (2013.01)

(58) Field of Classification Search
CPC .. C02F 3/305; C02F 1/66; C02F 3/006; C02F 3/307; C02F 3/341
USPC .................. 210/614, 611, 903, 143
See application file for complete search history.

(56) References Cited

U.S. PATENT DOCUMENTS

| | | |
|---|---|---|
| 8,894,857 B2 | 11/2014 | Liu et al. |
| 2003/0142301 A1* | 7/2003 | Coleman ............... G01N 21/65 356/301 |
| 2011/0073544 A1 | 3/2011 | McGrath et al. |
| 2011/0084022 A1* | 4/2011 | Lee .......................... C02F 3/301 210/605 |
| 2012/0309071 A1* | 12/2012 | Scherson ................ C01B 21/02 435/168 |
| 2013/0112601 A1 | 5/2013 | Silver et al. |
| 2014/0069864 A1* | 3/2014 | Wett ........................ C02F 3/006 210/605 |
| 2016/0122213 A1 | 5/2016 | Chandran et al. |
| 2016/0130164 A1 | 5/2016 | Whittier et al. |

OTHER PUBLICATIONS

Gong et al, "Performance of heterotrophic partial denitrification under feast-famine condition of electron donor: A case study using acetate as external carbon source", Bioresource Technology 133, pp. 263-269. (Year: 2012).*

Written Opinion of the International Searching Authority from International Patent Application No. PCT/US2017/038852, dated Sep. 21, 2017.

* cited by examiner

SYSTEMS AND METHODS FOR CONTROLLING DENITRIFICATION IN A DENITRIFYING BIOLOGICAL REACTOR

CROSS REFERENCE TO RELATED APPLICATION(S)

This application is a national stage filing of International Patent Application No. PCT/US2017/038852, filed Jun. 22, 2017, which claims the benefit of U.S. Provisional Application No. 62/353,305, filed Jun. 22, 2016, each of which are incorporated by reference as if disclosed herein in their entireties.

BACKGROUND

Nitrogen containing compounds, primarily ammonia, are a serious water pollutant, which governments have begun regulating more strictly. Combined with increasing population pressures, the need for an efficient method for removing nitrogen from sewage is growing. Nature's own nitrogen cycle employs specialized bacteria to convert ammonia to nitrites and nitrates. Different bacteria then convert these products into inert, atmospheric nitrogen gas. Waste treatment plants employ these same bacteria to perform "biological nitrogen removal" (BNR).

Conventional BNR is achieved by complete oxidation of ammonia to nitrate (nitrification) followed by the reduction of nitrate to dinitrogen gas (denitrification). The typical removal of ammonia involves its oxidation by nitrifying bacteria into nitrite ($NO_2^-$), and nitrate ($NO_3^{2-}$). The result is a mixture of nitrite and nitrate. Denitrifying bacteria then covert both nitrite and nitrate into nitrogen gas ($N_2$). The overall result is the conversion of ammonia, a harmful water pollutant, into harmless nitrogen gas, the major component of Earth's atmosphere. Each step of nitrification/oxidation and denitrification/reduction requires resources, such as in the forms of energy, aeration, and an electron source such as methanol, acetate, glycerol, and others.

The annual costs of treating U.S. wastewater alone are estimated to be $25 billion and escalating. It is also estimated that many more billions will be needed in future decades to maintain and replace ageing infrastructure. Furthermore, expanding wastewater infrastructure to accommodate an increasing population adds to this cost. Globally, there is an urgent need for lower-cost water treatment technologies in developed as well as developing countries and rural areas.

Denitrifying bacteria, though widely employed in BNR systems, are not understood in very great detail especially at the microbial level. Heterotrophic denitrifiers consume organic carbon and electron sources and reduce nitrate and nitrite to compounds with a lower nitrogen oxidative state. Nitrate may be reduced to nitrite, which may be reduced to nitrogen gas or even to ammonia in extremely anoxic conditions. Denitrifying bacteria are also a phylogenetically diverse group of species. Heterotrophic denitrifiers consume organic carbon as electron sources and reduce nitrate to compounds with a lower nitrogen oxidative state, such as nitrite or nitrogen gas. Previously, the control of denitrifying bacteria to stop denitrification from nitrate to nitrite has only been accomplished with anammox in the same reactor as the denitrifying bacteria, and this process typically relies on the use of sulphide, e.g., the DEAMOX process. Sulphide is highly toxic, and its production requires the presence of significant concentrations of sulphur in the water to be treated.

While denitrifying and anammox bacteria may coexist, denitrifying bacteria generally tend to out-compete anammox bacteria in long-term, continuously operated systems. Denitratation (conversion of nitrate to nitrite) has itself never been adequately controlled as an individual process.

SUMMARY

In order for nitrate to be reduced to nitrogen gas, more energy is used than is used to reduce nitrate to nitrite. Incomplete denitrification from nitrate only to nitrite, therefore, may be accomplished when relatively lower concentrations of organic carbon and energy sources exist, depending on the electron source. An excess of energy sources results in denitratation and subsequent denitritation (nitrite to nitrogen gas), which is ultimately the basis for the denitrification that occurs at waste water treatment plants (WWTPs) today.

In some embodiments, the present disclosure is directed to a system having a biological reactor including denitrifying bacteria for selective conversion of nitrate to nitrite. The operating conditions of the biological reactor are such that instead of complete denitrification of nitrate to nitrogen gas, the nitrate is reduced to nitrite and further reduction is substantially prevented. In some embodiments, the biological reactor includes a feed stream composed of sources of carbon or electrons, as well as the nitrate. In some embodiments, the solids retention time (SRT) in the reactor and chemical oxygen demand to nitrogen ratio (COD:N) in the feed stream are controlled to favor denitratation and limit denitritation. In some embodiments, the biological reactor produces a nitrite effluent which is fed to an anammox reactor for further reduction to nitrogen gas.

When employed in conjunction, limiting electron donor supply and anoxic SRTs can also result in effective denitratation either due to the selection of certain specialist bacteria or adaptation of generalist bacteria or a combination thereof.

The systems and methods of the present disclosure are applied to the treatment of wastewater (municipal, industrial, agricultural, or others) and/or groundwater contaminated with ammonium and/or nitrate. In some cases, ammonium nitrate including wastes are converted to mixtures of ammonium and nitrite, and an anammox reactor then removes the ammonium and nitrite to produce nitrogen gas. Thus, in some embodiments, ammonium nitrate is the influent to a denitrifying biological reactor with ammonium nitrite as the effluent.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
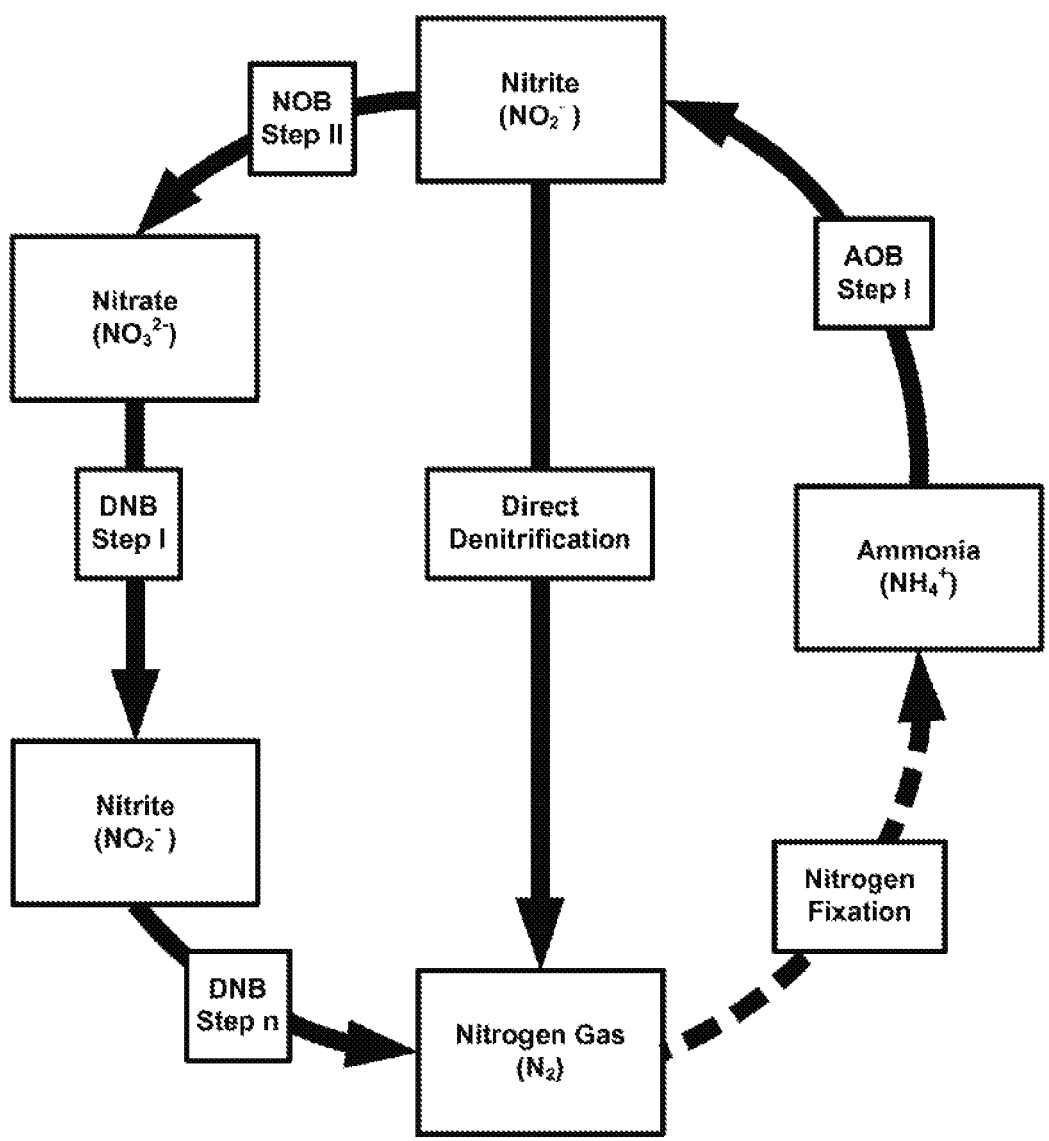
FIG. 1 is a schematic diagram of systems and methods according to some embodiments of the disclosed subject matter.

Referring now to FIG. 1 and as mentioned above, conventional BNR includes nitrification followed by denitrification. Nitrification includes first using AOB to oxidize ammonia to nitrite ($NO_2$) (AOB Step I) and then using NOB to further oxidize the nitrite to nitrate ($NO_3^{2-}$) (NOB Step II). Denitrification includes the reduction of nitrate, and any remaining nitrite, to nitrogen gas ($N_2$) (DNB Steps I . . . n).

Figure 2:
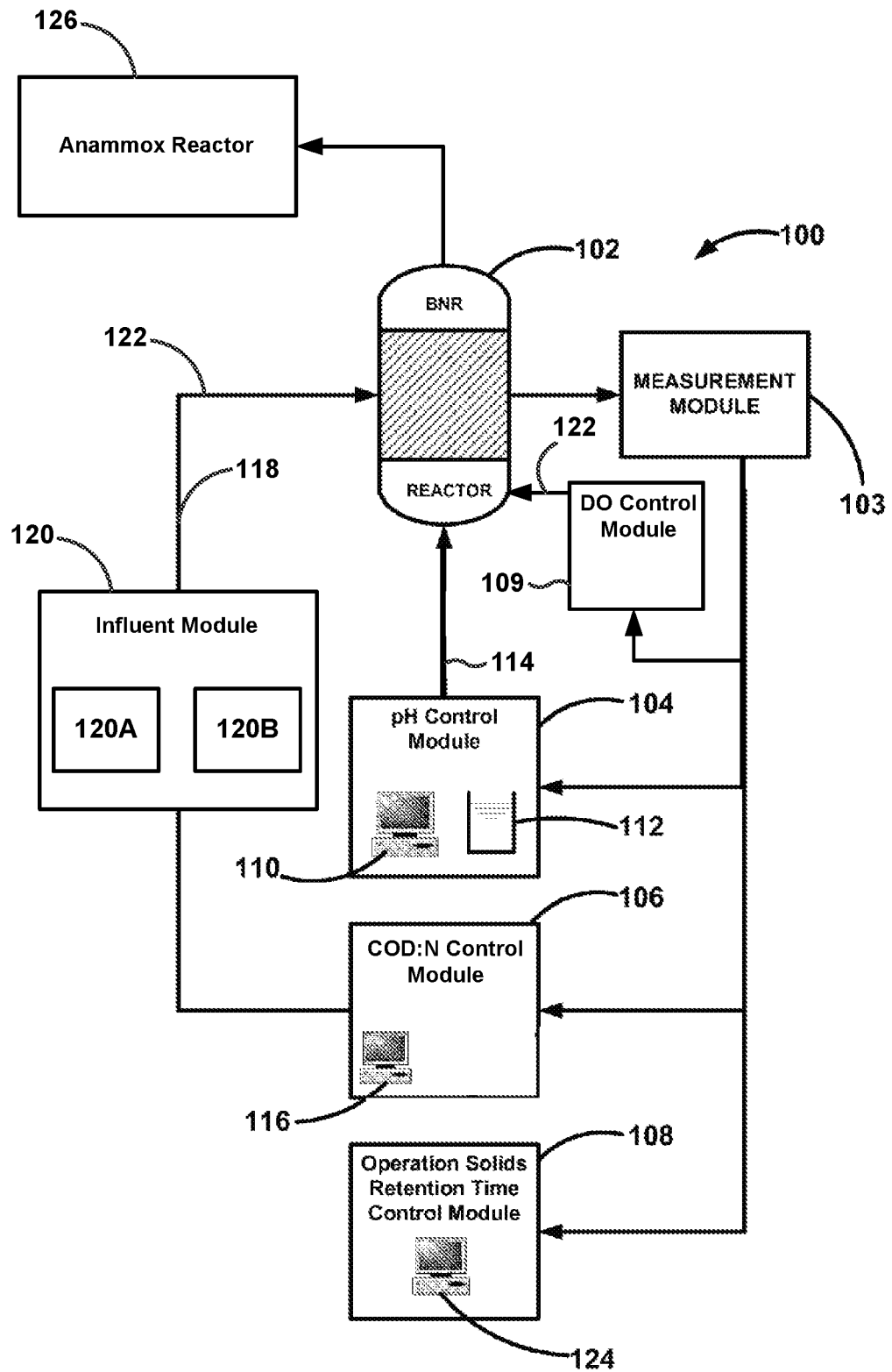
FIG. 2 is a schematic diagram of systems according to some embodiments of the disclosed subject matter.

Generally, the disclosed subject matter relates to systems and methods for controlling denitrification reactions so that denitratation is achieved over denitritation; e.g., controlling DNB Step I in FIG. 1 to favor the formation of nitrite versus the development of nitrogen gas. Referring now to FIG. 2, some embodiments of the disclosed subject matter include a system 100 for controlling a denitrification reaction in a denitrifying biological reactor 102 including denitrifying bacteria. As will be discussed in greater detail below, the operating conditions of reactor 102 are configured to favor denitratation of a nitrate to a nitrite, yet limit further denitritation of the nitrite to nitrogen gas. In some embodiments, system 100 includes a measurement module 103, a pH control module 104, a COD:N control module 106, and SRT control module 108.

Measurement module 103 includes testing apparatus for measuring pH, COD:N, operational SRT, dissolved oxygen (DO), and concentrations of various nitrogen species in reactor 102. Measurements from measurement module 103 are relayed to pH control module 104, COD:N control module 106, SRT control module 108, DO module 109, or a nitrogen species concentration module (not pictured).

pH control module 104 includes apparatus such as a software program (not shown) residing on a computing device 110 for comparing pH measured in reactor 102 to a predetermined range for promoting growth of the denitrifying bacteria. In some embodiments, the denitrifying bacteria are heterotrophic. In some embodiments, the denitrifying bacteria are autotrophic. In some embodiments, a substantial portion of the denitrifying bacteria in reactor 102 are related to bacteria such as *Methyloversatilis* spp., *Hyphomicrobium* spp, *Citrobacter* spp., *Acidovorax* spp., *Comamonas* spp., other denitrifying activated sludge bacteria, and the like, or a combination thereof. pH control module 104 also includes apparatus such as a chemical storage tank 112 and a conduit 114 for providing acids and/or bases to reactor 102 to adjust pH in the reactor if it is not within a predetermined range in an effort to bring it to within the predetermined range. In some embodiments, the predetermined range for pH is from about 6 to about 9. In some embodiments, the predetermined range for pH is from about 7 to about 8. In some embodiments, the predetermined range for pH is from about 7.4 to about 7.6. In some embodiments, chemicals for adjusting pH include sodium bicarbonate and/or hydrochloric acid. Of course, other chemicals that do not interfere with the growth of the denitrifying bacteria may also be used for adjusting pH in reactor 102.

In some embodiments, COD:N control module 106 includes apparatus such as a software program (not shown) residing on a computing device 116 for comparing COD:N measured in a feed stream 118 to a predetermined range for limiting the denitrifying bacteria from completing nitrification. COD:N control module 106 is in communication with an influent module 120. Influent module 120 includes at least a COD source 120A providing carbon and electrons and a nitrogen source 120B providing nitrate. In some embodiments, nitrogen source 120B also provides ammonium, ammonia, nitrite, or combinations thereof. In some embodiments, COD source 120A is composed of glycerol, methanol, ethanol, acetate, glucose, other organic or inorganic chemicals, or combinations thereof. In some embodiments, COD:N control module 106 includes alarms or alerts for adjusting COD:N in feed stream 118 if it is not within the predetermined range so that it is within the predetermined range. In some embodiments, nitrogen source 120B is composed of wastewater, contaminated groundwater, reject water from sludge, and the like, or combinations thereof. A feed stream 118 of COD source 120A and nitrogen source 120B is provided to reactor 102 at a given COD:N ratio.

In some embodiments, COD:N control module 106 and/or influent module 120 is in communication with reactor 102 for adjusting COD:N in the reactor using COD source 120A and nitrogen source 120B if it is not within the predetermined range so that it is within the predetermined range. In some embodiments, this fluid communication is provided via conduits 122. In some embodiments, the predetermined range for COD:N is about 2:1 to about 6:1. In some embodiments, the predetermined range for COD:N is about 2.4:1 to about 3:1. In some embodiments, feed stream 118 is fed continuously. In some embodiments, feed stream 118 is pulsed fed. In some embodiments, feed stream 118 is fed in spatial or temporal pulses. It has been shown that maintaining a COD:N within this range provides enough COD for conversion of nitrates to nitrites, but insufficient COD for continued conversion from nitrite to nitrogen gas.

SRT control module 108 includes apparatus such as a software program (not shown) residing on a computing device 124 for comparing the operational SRT of reactor 102 to a predetermined range suitable for maintaining concentrations of denitrifying bacteria in the denitrifying biological reactor while limiting denitritation of nitrite to nitrogen gas in the denitrifying biological reactor. In some embodiments, SRT control module 108 includes alarms or alerts for adjusting operational SRT in reactor 102 if it is not within the predetermined range so that it is within the predetermined range. In some embodiments, the predetermined range of the operational SRT is about 1 to about 5 days. In some embodiments, the predetermined range of operational SRT is about 2.5 to about 3.5 days. Maintaining the operational SRT in these ranges selects for bacterial populations useful in system 100, but also prevents that population from acclimating to COD source and COD:N dose 120A and accelerating denitritation.

In some embodiments, system 100 includes DO control module 109. In some embodiments, DO control module 109 includes apparatus such as a software program residing on a computing device for comparing DO measured in reactor 102 to a predetermined range. DO control module 109 also includes apparatus such as an oxygen supply, chemical supply, and conduits 122 for adjusting DO in reactor 102 if it is not within the predetermined range so that it is within the predetermined range. In some embodiments, the predetermined range for DO is about 0 to 2 mg $O_2$/L. In some embodiments, chemical supply 120 includes ammonium and DO is adjusted by injecting a mixture of oxygen and ammonium into reactor 102 via conduits 122.

System 100 is typically operated so that reactor 102 is at a temperature substantially close to ambient. In some embodiments, system 100 is operated so that reactor 102 is at a temperature of about 15° C. to about 35° C. In some embodiments, system 100 is operated so that reactor 102 is at a temperature of about 20° C. to about 30° C. System 100 is configured to operate either manually or automatically and in real time.

Still referring to FIG. 2, in some embodiments, system 100 includes an anammox reactor 126. In some embodiments, anammox reactor includes anammox bacteria. In some embodiments, anammox reactor 126 is in fluid communication with reactor 102. In some embodiments, anammox reactor 126 is configured for consuming ammonium nitrite effluent from reactor 102 to produce nitrogen gas.

Figure 3:
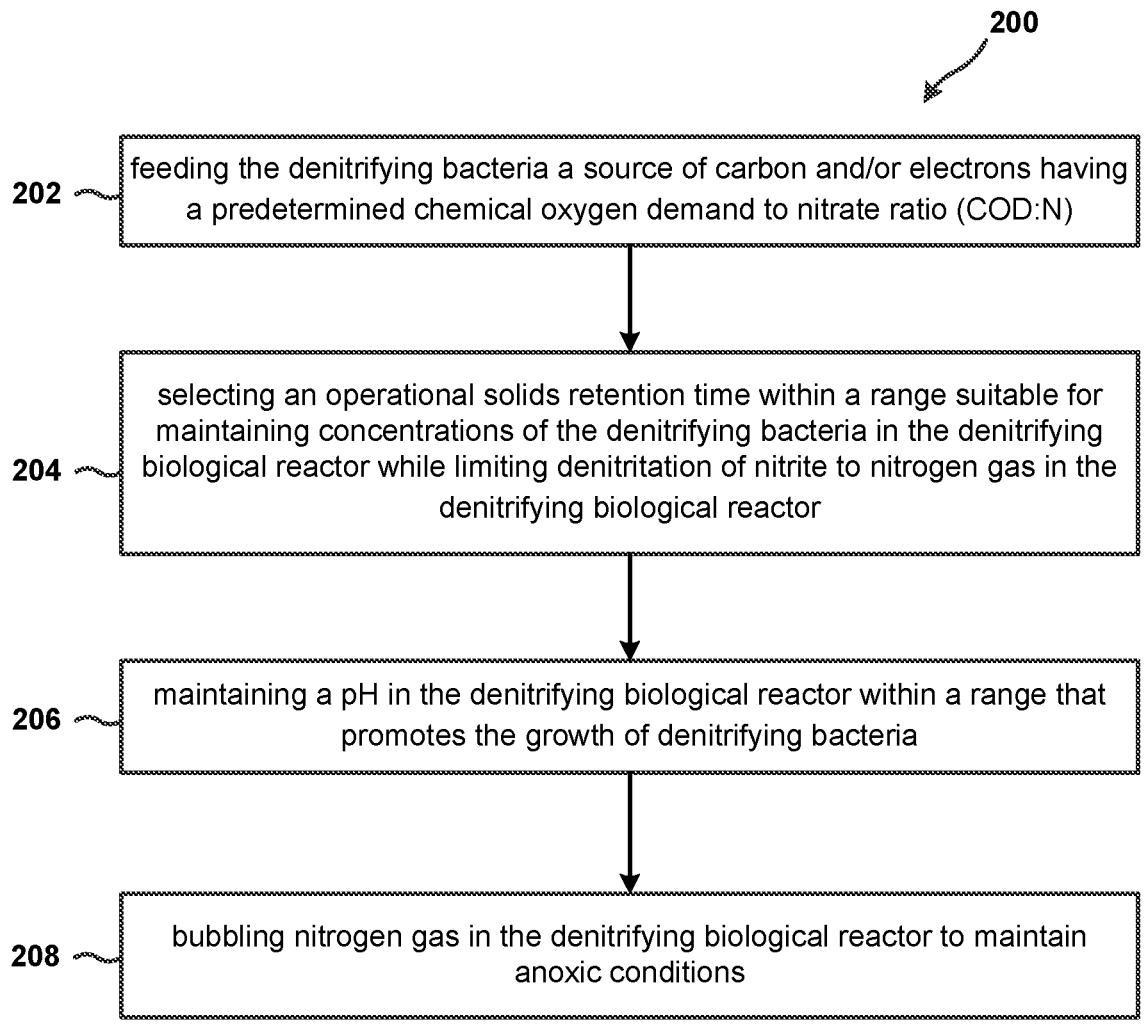
FIG. 3 is a diagram of a method according to some embodiments of the disclosed subject matter.

Referring now to FIG. 3, some embodiments include a method 200 of controlling a denitrification reaction in a denitrifying biological reactor including denitrifying bacteria to favor denitratation of nitrate to nitrite and limit denitritation of nitrite to nitrogen gas. At 202, denitrifying bacteria is fed a source of carbon and/or electrons having a predetermined COD:N. At 204, an operational solids retention time within a range suitable for maintaining concentrations of the denitrifying bacteria in the denitrifying biological reactor while limiting denitritation of nitrite to nitrogen gas in the denitrifying biological reactor is selected. At 206, a pH is maintained in the denitrifying biological reactor within a range that promotes the growth of denitrifying bacteria. In some embodiments, at 208, nitrogen gas is bubbled in the denitrifying biological reactor to help maintain anoxic conditions. In some embodiments, a concentration of free ammonia in the denitrifying biological reactor is increased to inhibit nitrite conversion in the denitrifying biological reactor. In some embodiments, reactor is temporarily primed with a higher COD:N ratio to induce a feast condition in the reactor, after which the COD:N ratio is lowered to about 2:1 to about 3.5:1, or about 2.4:1 to about 3:1 or other ranges suitable for specific systems.

The impact and role of SRT in combination with COD limitation was tested using glycerol as carbon source in a lab scale reactor. For the system setup in this study, a sampling tube collects samples from a feed tank, containing ammonia and nitrate, where an influent pump, which may include a built in timer, sends timed samples to a tank including a magnetic stir bar and plate, which is also pump fed by a Glycerol Reservoir, an Acid Reservoir, and feeds a pH meter/control pump.

One such study for this disclosure relates to a denitratation reactor that began operating 14 Sep. 2015. Phase 1 was an enrichment phase that lasted 59 days from 14 Sep.-12 Nov. 2015. Phases 2-6 tested denitratation performance using different combinations of COD:N ratios, SRTs, and feeding techniques. The HRT for all phases was 1 day, the reactor was operated at ambient room temperature (about 25° C.), and pH was controlled at 7.50+/−0.05. The reactor was set to run on 4×6 hour cycles per day. Each cycle consisted of 4.5 hours of feed and anoxic react, 0.83 hours of settling, and 0.67 hours of decanting. Each feeding phase added 3 liters of feed and each decanting phase removed 3 liters of supernatant. Feed concentrations were maintained at approximately 20-30 mg N/L of ammonia, 0 mg N/L of nitrite, and 100 mg N/L of nitrate, and inorganic micronutrients were also included in the feed.

TABLE 1

Summary of continuous denitratation process using glycerol as external electron donor.

| Dates | COD:NO$_3^-$ N | Feeding Method (simultaneous COD & N since 13 Nov. 2015) | SRT (days) | Test Length (days) | Average Effluent NH$_4^+$ (mg N/L) | Average Effluent NO$_2^-$ (mg N/L) | Average Effluent NO$_3^-$ (mg N/L) |
|---|---|---|---|---|---|---|---|
| 13-27 Nov. 2015 | 2.4:1 | 6 x pulses simultaneous COD & N | 5 | 15 | 9.8 | 65.8 | 37.5 |
| 4-18 Dec. 2015 | 2.4:1 | Continuous simultaneous COD & N | 5 | 15 | 6.7 | 71.2 | 24.8 |
| 19 Dec. 2015-2 Jan. 2016 | 2.4:1 | 6 x pulses simultaneous COD & N | 3 | 15 | 10.8 | 68.9 | 15.6 |
| 3-17 Jan. 2016 | 2.4:1 | Continuous simultaneous COD & N | 3 | 15 | 6.4 | 70.1 | 16.0 |

A summary of the results can be seen in Table 1, which indicate that the best of the four tested scenarios in terms of both nitrate reduction and nitrite accumulation was at an influent COD:N of 2.4:1 and an anoxic SRT of 3 days.

Based on these more detailed studies, the recommended values of COD:N at which nitrite production can be achieved is between a range of 0 and 4 mg COD: 1 mg NO$_3$-N. Similarly, the range of SRT values at partial denitratation can be achieved is approximately 3-5 days at 20 degrees Celsius and less than 7 days under most conditions. Nitrite production can be achieved by controlling the pH, DO, COD:N and SRT either by themselves or in conjunction.

Methods and systems according to the disclosed subject matter provide advantages and benefits over known methods and systems. Specifically, the denitrifying biological reactor of the present disclosure significantly decreases the overall energy cost associated with aerating traditional wastewater treatment processes by being operable under anoxic conditions. The denitrifying biological reactor may also be coupled with an anammox reactor, which is both cost effective and environmentally friendly. The systems and methods are able to provide these advantages while efficiently treating sources of nitrate.

The present disclosure thus allows for efficient, affordable, and environmentally conscious nitrogen removal from water contaminated with nitrate and/or both ammonium and nitrate. Aeration requirements constitute most of the energy and operating costs in a traditional wastewater treatment plant, and the systems and methods of the present disclosure eliminate or significantly decrease the aeration requirements for treating water containing both ammonium and nitrate. This is applicable for treatment of municipal, industrial, and/or agricultural wastewater, contaminated groundwater and any other applicable stream.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of controlling a denitrification reaction in a denitrifying biological reactor including denitrifying bacteria to favor denitratation of nitrate to nitrite and limit denitritation of nitrite to nitrogen gas, said method comprising:
    feeding said denitrifying bacteria a source of carbon and electrons having a first predetermined chemical oxygen demand to nitrogen ratio (COD:N) to induce a feast condition in said denitrifying biological reactor;
    feeding said denitrifying bacteria a source of carbon and electrons having a second predetermined COD:N, wherein said first COD:N is greater than said second COD:N; and
    selecting an operational solids retention time within a range suitable for maintaining concentrations of said denitrifying bacteria in said denitrifying biological reactor while limiting denitritation of nitrite to nitrogen gas in said denitrifying biological reactor;
    wherein said second COD:N is between about 2.4:1 and about 3:1;
    wherein said solids retention time is about 1 to 5 days, and
    wherein said source of carbon and electrons includes glycerol.

2. The method according to claim 1, further comprising maintaining a pH in said denitrifying biological reactor within a range that promotes the growth of denitrifying bacteria.

3. The method according to claim 2, wherein said pH is about 7 to about 8.

4. The method according to claim 1, wherein said denitrifying biological reactor is operated at a temperature that is about 15° C. to about 35° C.

5. The method according to claim 1, wherein a portion of said denitrifying bacteria in said denitrifying biological reactor is *Methyloversatilis* spp., *Hyphomicrobium* spp, *Citrobacter* spp., *Acidovorax* spp., *Comamonas* spp., or combinations thereof.

6. The method according to claim 1, wherein said feeding said denitrifying bacteria a source of carbon and electrons having a predetermined chemical oxygen demand to nitrogen ratio (COD:N) is continuous.

7. The method according to claim 1, wherein said source of carbon and electrons includes methanol, ethanol, glucose, or combinations thereof.

8. The method according to claim 1, further comprising bubbling nitrogen gas in said denitrifying biological reactor to maintain anoxic conditions.

9. A system for controlling denitrification in a denitrifying biological reactor including denitrifying bacteria to favor denitratation of nitrate to nitrite and limit denitritation of nitrite to nitrogen gas comprising:
    a feed stream including a source of carbon and electrons having a predetermined chemical oxygen demand to nitrogen ratio (COD:N) in fluid communication with said denitrifying biological reactor;
    a measurement module for measuring pH, COD:N, and solids retention time in said denitrifying biological reactor;
    a pH control module for maintaining pH in said denitrifying biological reactor within a range that promotes growth of denitrifying bacteria;
    a COD:N control module for maintaining said predetermined COD:N within a first range that induces a feast condition in said denitrifying biological reactor and subsequently a second range that limits denitritation of nitrite to nitrogen gas in said denitrifying biological reactor, wherein said first COD:N is greater than said second COD:N; and
    a solids retention time control module for maintaining an operational solids retention time in said denitrifying biological reactor within a range suitable for maintaining concentrations of said denitrifying bacteria in said denitrifying biological reactor while limiting denitritation of nitrite to nitrogen gas in said denitrifying biological reactor;
    wherein said second COD:N is between about 2.4:1 and about 3:1;
    wherein said solids retention time is about 1 to 5 days, and
    wherein said source of carbon and electrons includes glycerol.

10. The system according to claim 9, wherein said pH in said denitrifying biological reactor is about 7 to about 8.

11. The system according to claim 9, wherein said pH control module includes apparatus for adding an acid to said denitrifying biological reactor to adjust pH.

12. The system according to claim 9, wherein said feed stream is fed continuously.

13. The system according to claim 9, wherein said source of carbon and electrons includes methanol, ethanol, glucose, or combinations thereof.

14. The system according to claim 9, wherein said denitrifying biological reactor is operated at a temperature that is about 15° C. to about 35° C.

15. A system for controlling a denitrification reaction, said system comprising:
    a denitrifying biological reactor including denitrifying bacteria to favor denitratation of nitrate to nitrite and limit denitritation of nitrite to nitrogen gas;
    a denitrifying biological reactor influent composed of nitrate and a source of carbon and electrons;
    a feed module in fluid communication with said denitrifying biological reactor for feeding said influent having a predetermined chemical oxygen demand to nitrogen ratio (COD:N);
    a measurement module for measuring reactor pH, COD:N, and reactor solids retention time;
    a pH control module for maintaining reactor pH in said denitrifying biological reactor;
    a COD:N control module for maintaining said predetermined COD:N within a first range that induces a feast condition in said denitrifying biological reactor and subsequently a second range that limits denitritation of nitrite to nitrogen gas in said denitrifying biological reactor, wherein said first COD:N is greater than said second COD:N;
    a solids retention time control module for maintaining an operational solids retention time in said denitrifying biological reactor within a range suitable for maintaining concentrations of said denitrifying bacteria in said denitrifying biological reactor while limiting denitritation of nitrite to nitrogen gas in said denitrifying biological reactor; and
    an anammox bioreactor including anammox bacteria for consuming ammonium nitrite effluent from said denitrifying biological reactor to produce nitrogen gas;
    wherein said second COD:N is between about 2.4:1 and about 3:1;
    wherein said source of carbon and electrons includes glycerol, and
    wherein said solids retention time is about 2.5 to 3.5 days.

16. The system according to claim 15, wherein said source of carbon and electrons includes methanol, ethanol, glucose, or combinations thereof.

\* \* \* \* \*